(12) United States Patent
Nishibe et al.

(10) Patent No.: US 12,445,590 B2
(45) Date of Patent: Oct. 14, 2025

(54) HEAD-MOUNTED DISPLAY AND IMAGE DISPLAYING METHOD

(71) Applicant: SONY INTERACTIVE ENTERTAINMENT INC., Tokyo (JP)

(72) Inventors: Mitsuru Nishibe, Chiba (JP); Haruka Iwaki, Kanagawa (JP); Kuniaki Oe, Tokyo (JP); Takanori Minamino, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 77 days.

(21) Appl. No.: 18/353,905

(22) Filed: Jul. 18, 2023

(65) Prior Publication Data

US 2024/0031552 A1 Jan. 25, 2024

(30) Foreign Application Priority Data

Jul. 25, 2022 (JP) .................... 2022-118226

(51) Int. Cl.
*H04N 13/332* (2018.01)
*H04N 13/00* (2018.01)

(52) U.S. Cl.
CPC ............. *H04N 13/332* (2018.05); *H04N 2013/0085* (2013.01)

(58) Field of Classification Search
CPC ......... H04N 13/332; H04N 2013/0085; H04N 13/344; H04N 13/366; G02B 27/0093; G02B 2027/014; G02B 2027/0178; G02B 2027/0134; G02B 27/0172; G02B 2027/0138; G06F 3/011; G06T 19/006

USPC ............................................. 348/53
See application file for complete search history.

(56) References Cited

U.S. PATENT DOCUMENTS

| | | | |
|---|---|---|---|
| 10,979,685 B1* | 4/2021 | Silverstein | H04N 13/117 |
| 11,087,479 B1* | 8/2021 | Geraghty | G06T 19/006 |
| 11,520,409 B2* | 12/2022 | Kwon | G06V 20/20 |
| 2013/0027523 A1* | 1/2013 | Girdzijauskas | H04N 13/128 348/48 |
| 2013/0093763 A1* | 4/2013 | Shinoda | G06F 3/04815 345/419 |
| 2016/0048230 A1* | 2/2016 | Shimoda | H04N 13/156 345/633 |
| 2017/0270715 A1* | 9/2017 | Lindsay | G06T 7/60 |
| 2017/0358141 A1* | 12/2017 | Stafford | G06T 7/246 |
| 2017/0365102 A1* | 12/2017 | Huston | A63F 13/65 |
| 2018/0293041 A1* | 10/2018 | Harviainen | H04N 13/332 |
| 2019/0310348 A1* | 10/2019 | Yamao | G06V 10/758 |
| 2020/0158529 A1* | 5/2020 | Zhang | G01C 21/3881 |
| 2020/0210051 A1* | 7/2020 | Fukazawa | G06F 3/011 |
| 2020/0368616 A1 | 11/2020 | Delamont | |

(Continued)

*Primary Examiner* — Tung T Vo
(74) *Attorney, Agent, or Firm* — Kilpatrick Townsend & Stockton LLP

(57) ABSTRACT

Disclosed is a head-mounted display implementing stereoscopic vision, including a superimposition image controlling section that determines a virtual distance of a superimposition image to be displayed, according to a state of a three-dimensional space in a field of view, a display image generation section that generates data of a display image including the superimposition image in a state in which the superimposition image is placed at the virtual distance in the three-dimensional space, and an output controlling section that outputs the data of the display image to a display panel.

20 Claims, 7 Drawing Sheets

(56) References Cited

U.S. PATENT DOCUMENTS

| | | | |
|---|---|---|---|
| 2021/0235054 A1* | 7/2021 | Silverstein | G06F 3/013 |
| 2021/0348927 A1* | 11/2021 | Imai | G01C 21/206 |
| 2022/0187903 A1* | 6/2022 | Wang | G06V 40/103 |
| 2023/0139626 A1* | 5/2023 | Berliner | G06F 1/1694 |
| | | | 345/156 |
| 2024/0028177 A1* | 1/2024 | Pastrana Vicente | G06F 3/013 |
| 2024/0312159 A1* | 9/2024 | Kawamae | G06F 3/0481 |
| 2024/0331319 A1* | 10/2024 | Shiokawa | G06F 3/011 |

* cited by examiner

HEAD-MOUNTED DISPLAY AND IMAGE DISPLAYING METHOD

CROSS REFERENCE TO RELATED APPLICATIONS

This application claims the benefit of Japanese Priority Patent Application JP 2022-118226 filed Jul. 25, 2022, the entire contents of which are incorporated herein by reference.

BACKGROUND

The present disclosure relates to a head-mounted display and an image displaying method for displaying a superimposition image in a field of view.

An image displaying system that allows a target space to be appreciated from a free point of view is widespread. For example, there has been developed a system in which a panorama screen image is displayed on a head-mounted display and an image according to a line-of-sight direction of a user who wears the head-mounted display is displayed. By utilizing the head-mounted display, it is possible to enhance a sense of immersion in a screen image or improve operability of an application such as a game.

Also, such a technology that implements augmented reality (AR) or mixed reality (MR) by providing a video camera for capturing an image of an actual space on a head-mounted display and combining a computer graphics image with the captured image by the video camera has been put into practical use. Further, if the captured image is displayed immediately, then even with a head-mounted display of closed type, the user can easily confirm a situation surrounding the user. Further, a head-mounted display of light transmission type makes it possible for the user to confirm information while viewing the actual world.

SUMMARY

In such a technology as described above, it is sometimes desired to display, while the situation of an actual space or a virtual space, which is main image, is stereoscopically viewed, various kinds of information such as a dialog box, a help screen image, a control panel, or an indicator in a manner being superimposed on the main image. From a characteristic of the display contents of such a superimposition image, in general, an image of a simple two-dimensional structure in a form of a window is made to appear in front, with no relation to any other display images. However, in a situation in which the main image is stereoscopically viewed, it possibly occurs that such a superimposition image looks unnatural or is hard to be focused. In some cases, there is a possibility that the user may fall into a poor physical condition such as visually induced motion sickness.

The present disclosure has been made in light of the foregoing, and it is desirable to provide a technology that makes it possible for a display that implements stereoscopic vision such as a head-mounted display, to display a superimposition image in a manner being visually recognized easily and naturally.

According to a mode of the present disclosure, there is provided a head-mounted display implementing stereoscopic vision, including a superimposition image controlling section that determines a virtual distance of a superimposition image to be displayed, according to a state of a three-dimensional space in a field of view, a display image generation section that generates data of a display image including the superimposition image in a state in which the superimposition image is placed at the virtual distance in the three-dimensional space, and an output controlling section that outputs the data of the display image to a display panel.

According to another mode of the present disclosure, there is provided an image displaying method performed by a head-mounted display implementing stereoscopic vision, the image displaying method including determining a virtual distance of a superimposition image to be displayed in response to a state of a three-dimensional space in a field of view, generating data of a display image including the superimposition image in a state in which the superimposition image is placed in the virtual distance in the three-dimensional space, and outputting data of the display image to a display panel.

It is noted that any combinations of the constituent components described above and the expressions of the present disclosure that are converted between a method, an apparatus, a system, a computer program, a data structure, a recording medium, and the like are also effective as modes of the present disclosure.

According to an embodiment of the present disclosure, it is possible for a display that implements stereoscopic vision, such as a head-mounted display, to display a superimposition image in a manner being visually recognized easily and naturally.

DETAILED DESCRIPTION OF THE PREFERRED EMBODIMENT

An embodiment of the present disclosure relates to an apparatus that displays, in a state in which a picture of a three-dimensional space is stereoscopically viewed, an image prepared separately in a manner being superimposed on the picture in the three-dimensional space. The three-dimensional space may be an actual space or a virtual space. The picture representative of the actual space may be an image captured by a camera or may be a picture having passed through an optical system. In other words, the apparatus of the present embodiment may display only a superimposition image or may combine a superimposition image while displaying an image of a three-dimensional space. The following description is given mainly of a mode in which a superimposition image is combined while an image including a captured image is displayed on a head-mounted display.

Figure 1:
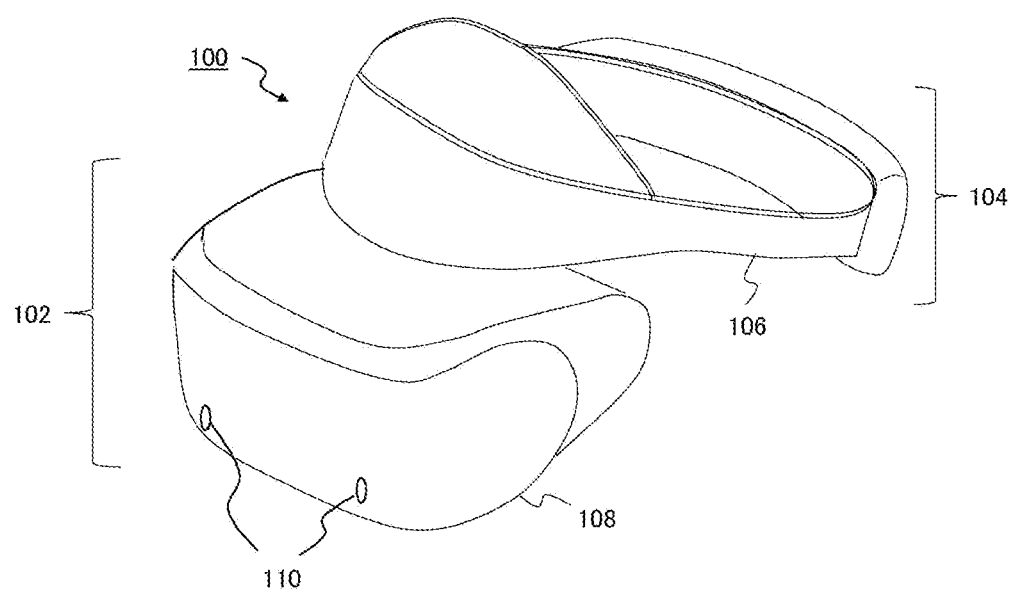
FIG. 1 is a view depicting an example of an appearance of a head-mounted display of an embodiment of the present disclosure.

FIG. 1 depicts an example of an appearance of a head-mounted display 100. In the present example, the head-mounted display 100 includes an outputting mechanism section 102 and a mounting mechanism section 104. The mounting mechanism section 104 includes a mounting band 106 that goes, when the head-mounted display 100 is worn by a user, around the head of the user to implement fixation of the apparatus. The outputting mechanism section 102 includes a housing 108 shaped such that it covers both of the left and right eyes in a state in which the head-mounted display 100 is worn by the user. The outputting mechanism section 102 includes a display panel 122 provided therein so as to be opposed to the eyes when the head-mounted display 100 is worn.

The housing 108 further includes, in the inside thereof, eyepieces that are positioned between the display panel 122 and the eyes of the user when the head-mounted display 100 is worn and enlarges an image to be viewed. The head-mounted display 100 may further include speakers and earphones at positions corresponding to the ears of the user when the head-mounted display 100 is worn. Further, the head-mounted display 100 has a motion sensor built therein such that it detects a translational movement and a rotational movement of the head of the user who wears the head-mounted display 100 and additionally detects the position and the posture of the head of the user at every time.

The head-mounted display 100 further includes stereo cameras 110 on a front face of the housing 108. The present embodiment provides a mode in which a moving image being captured by the stereo cameras 110 is displayed after a less delay such that a situation of the actual space in a direction in which the user is oriented can look as it is. Such a mode as just described is hereinafter referred to as a "see-through mode." For example, the head-mounted display 100 automatically sets a period during which an image of content is not displayed to the see-through mode.

Consequently, before starting, after ending, at interruption or the like of content, the user can confirm a situation of the surroundings without removing the head-mounted display 100. In addition, the see-through mode may be started or ended, taking it as an opportunity that the user explicitly performs an operation. Accordingly, even during appreciation of content, the display can be switched temporarily at a desired timing to an image of an actual space, and the user can perform a necessary work such as coping with a sudden event in the actual world. It is to be noted that, although, in the example depicted, the stereo cameras 110 are placed at a lower portion of the front face of the housing 108, the placement of the stereo cameras 110 is not restricted specifically. Further, a camera other than the stereo cameras 110 may be provided.

A captured image by the stereo cameras 110 can be utilized also as an image of content. For example, AR or MR can be implemented by combining and displaying a virtual object with the captured image according to a position, a posture, and a movement conforming to those of actual physical objects being present in the field of view of each of the cameras. Also, it is possible to analyze a captured image irrespective of whether or not the captured image is to be included in the display and determine a position, a posture, and a movement of an object to be drawn with use of a result of the analysis.

For example, stereo matching may be performed for a captured image to extract corresponding points of a picture of a subject and acquire the distance of the subject by the principle of triangulation. Alternatively, a known technology such as Visual SLAM (Simultaneous Localization and Mapping) may acquire a position and a posture of the head-mounted display 100 and additionally of the head of the user with respect to the surrounding space. The processes described make it possible to draw and display a virtual world with the field of view corresponding to the position of the point of view and the direction of the line of sight of the user.

Figure 2:
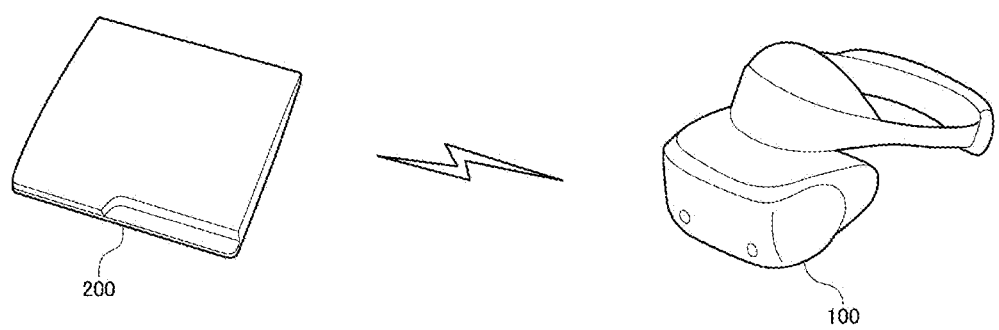
FIG. 2 is a view depicting an example of a configuration of an image displaying system of the present embodiment.

FIG. 2 depicts an example of a configuration of an image displaying system in the present embodiment. In the image displaying system 10, the head-mounted display 100 is connected to a content processing apparatus 200 by wireless communication or an interface that connects peripheral equipment, like universal serial bus (USB) Type-C. The content processing apparatus 200 may be connected further to a server through a network. In this case, the server may provide an online application such as a game, in which a plurality of users can participate through the network, to the content processing apparatus 200.

The content processing apparatus 200 basically is an information processing apparatus which processes content to generate a display image and transmits the display image to the head-mounted display 100 so as to be displayed on the head-mounted display 100. Typically, the content processing apparatus 200 specifies the position of the point of view and the direction of the line of sight of the user on the basis of the position and the posture of the head of the user who wears the head-mounted display 100 and generates a display image with the field of view corresponding to the specified pieces of information. For example, the content processing apparatus 200 generates, while it progresses an electronic game, an image representative of a virtual world that is a stage of the game to implement virtual reality (VR).

In the present embodiment, the content to be processed by the content processing apparatus 200 is not particularly limited to any kind, and AR or MR may be implemented as the content as described above, or the content may include the display image produced in advance, such as a movie. In the following description, an image other than a real time image in an actual space displayed in the see-through mode is referred to as a "content image."

Figure 3:
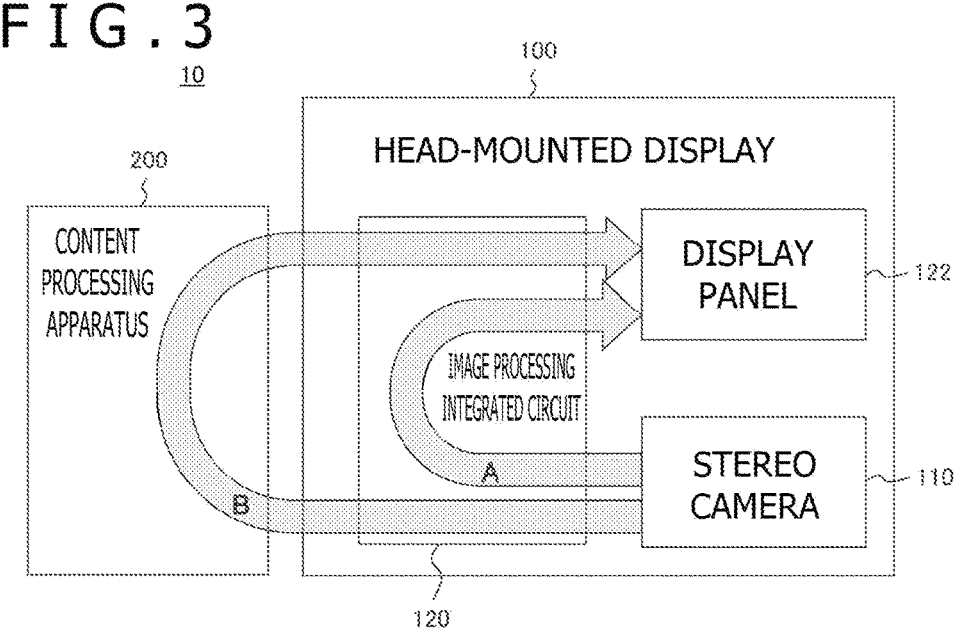
FIG. 3 is a view schematically depicting a path of data in the image displaying system of the present embodiment.

FIG. 3 schematically depicts a path of data in the image displaying system 10 of the present embodiment. The head-mounted display 100 includes the stereo cameras 110 and the display panel 122, as described hereinabove. The display panel 122 is a panel having a general display mechanism of a liquid crystal display, an organic electroluminescence (EL) display, or the like. In the present embodiment, the display panel 122 displays images for the left eye and the right eye, which configure a frame of a moving image, in left and right regions thereof which are opposed to the left eye and the right eye of the user, respectively.

By forming a pair of stereo images having a parallax corresponding to the distance between the eyes from the left eye image and the right eye image, it is possible to cause the display target to be viewed stereoscopically. The display panel 122 may include two panels including a panel for the left eye and a panel for the right eye placed side by side or may include a single panel that displays an image including an image for the left eye and an image for the right eye connected laterally to each other.

The head-mounted display 100 further includes an image processing integrated circuit 120. The image processing integrated circuit 120 is, for example, a system on chip on which various functional modules including a central processing unit (CPU) are mounted. It is to be noted that the head-mounted display 100 may further include motion sensors such as a gyro sensor, an acceleration sensor and an angular speed sensor, a main memory such as a dynamic random access memory (DRAM), an audio circuit for generating sound to be heard by the user, a peripheral equipment interface circuit for connecting peripheral equipment, and so forth, as described hereinabove. However, illustration of them is omitted in FIG. 3.

Two data paths in a case where images captured by the stereo cameras 110 are to be included in display are indicated by arrow marks in this figure. In a case in which AR or MR is to be implemented, in general, captured images by the stereo cameras 110 are fetched into a main body that processes content, and the captured images are combined with a virtual object by the main body to generate a display image. Since, in the image displaying system 10 depicted in FIG. 3, the main body that processes content is the content processing apparatus 200, the images captured by the stereo cameras 110 are transmitted once to the content processing apparatus 200 via the image processing integrated circuit 120 as indicated by an arrow mark B.

Then, a virtual object is combined with the captured images to generate a display image, for example, and the generated display image is returned to the head-mounted display 100 and then displayed on the display panel 122. On the other hand, in the case of the see-through mode, the images captured by the stereo cameras 110 can be corrected to a display image suitable for display by the image processing integrated circuit 120 and then displayed on the display panel 122 as indicated by an arrow mark A. A data transmission path through the path of the arrow mark A is much shorter than the path of the arrow mark B, and accordingly, a length of time from capturing of an image to display of the image can be reduced, and the power consumption required for the transmission can be reduced.

It is to be noted that this is not intended to restrict the data path in the see-through mode in the present embodiment to that of the arrow mark A. In other words, the path of the arrow mark B may be adopted such that the images captured by the stereo cameras 110 are transmitted once to the content processing apparatus 200. Then, after the captured images are corrected to obtain a display image by the content processing apparatus 200, the display image may be returned to the head-mounted display 100 so as to be displayed thereon.

In any cases, in the present embodiment, the captured images by the stereo camera 110 are preferably pipe-line processed sequentially in a unit smaller than one frame such as a unit of a row to minimize a length of time taken before display. This decreases a possibility that a screen image may be displayed with a delay with respect to a movement of the head and the user may suffer from discomfort or visually induced motion sickness.

Figure 4:
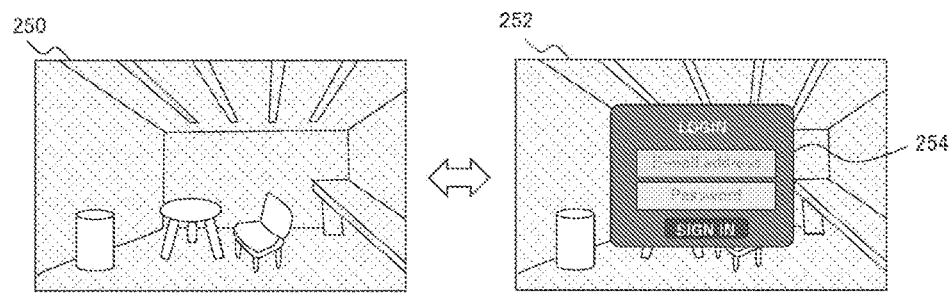
FIG. 4 is a view schematically depicting an image of a see-through mode displayed by the head-mounted display in the present embodiment and an image in which a superimposition image is combined with the image of the see-through mode.

FIG. 4 schematically depicts an image in the see-through mode displayed by the head-mounted display 100 and an image obtained by combining the image with a superimposition image. An image 250 is one frame of an image in the see-through mode (hereinafter referred to as a see-through image) and corresponds to images obtained when the stereo cameras 110 capture images of a situation in a room in front of the head-mounted display 100. Actually, a pair of images for the left eye and the right eye in which pictures of the same thing are displaced by an amount corresponding to a parallax in a horizontal direction are generated and are displayed in the left and right regions of the display panel 122, respectively. Further, when a display image is generated from the captured images, an angle of view is corrected suitably.

Naturally, if the user changes the orientation of the face, then also the field of view of the see-through image 250 changes. In this state, the head-mounted display 100 displays an image 252 in which a superimposition image 254 is combined with the see-through image 250 according to a request from the user, the necessity by the system, and so forth. In the example depicted, a dialog box that allows the user to input an address and a password for login is displayed. When the user inputs necessary information to the dialog box, the head-mounted display 100 hides the display of the superimposition image 254 thereby to restore the original display of the see-through image 250.

As depicted in FIG. 4, in order to make the superimposition image 254 appear at part of the display image in which stereoscopic vision is implemented, settings that take a three-dimensional space of the display target into consideration are required. In particular, it is demanded to determine a position of an object of the superimposition image 254 including the axis in the depthwise direction and generate a pair of left and right images with a parallax corresponding to the position of the object. It is to be noted that, in the following description, an object in a superimposition image placed in a three-dimensional space is also sometimes referred to as a "superimposition image."

Figure 5:
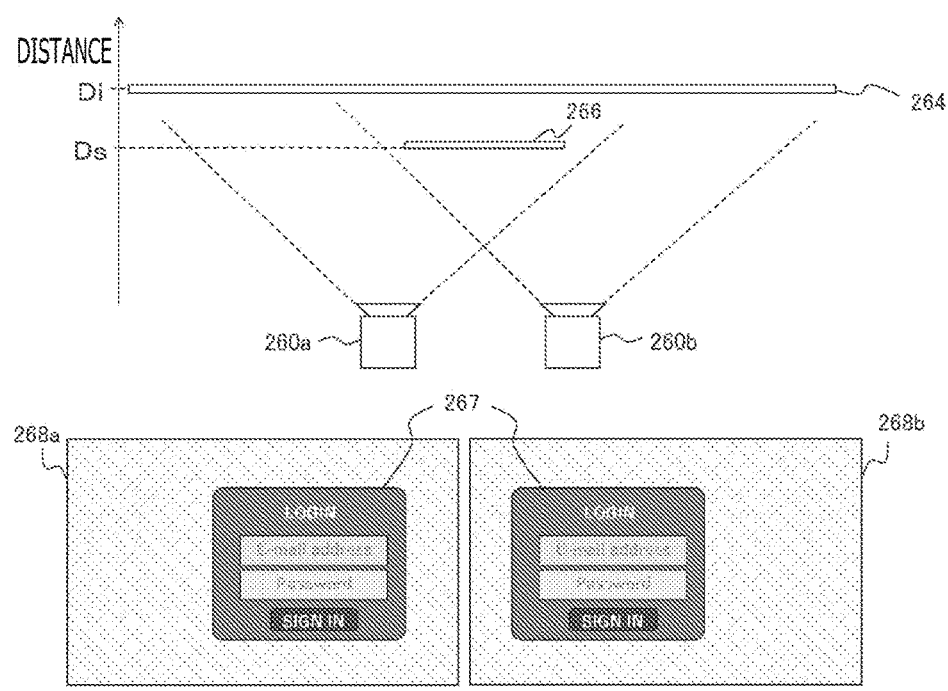
FIG. 5 is a view depicting an example of a position of a superimposition image and images for the left eye and the right eye when an axis in a depthwise direction of a three-dimensional space is taken into consideration in the present embodiment.

FIG. 5 depicts an example of a position of a superimposition image and images for the left eye and the right eye when the axis in the depthwise direction of a three-dimensional space is taken into consideration. An upper portion in FIG. 5 depicts a state in which a virtual three-dimensional space formed upon generation of a display image is in a bird's-eye view. Cameras 260a and 260b are virtual rendering cameras for generating a display image, and an upward direction in FIG. 5 represents the depthwise direction (a distance from the cameras 260a and 260b). In a normal state in which a superimposition image is not displayed, the head-mounted display 100 places a see-through image 264 in a predetermined distance Di in the virtual space.

It is to be noted that the see-through image 264 may be images for the left eye and the right eye generated with use of stereo images captured by the stereo cameras 110. If it becomes necessary to display a superimposition image 267, then the head-mounted display 100 places a superimposition image 266, for example, at a distance Ds in the virtual space. In both of a case where only the see-through image 264 is to be displayed and a case where the superimposition image 266 is placed additionally, display images for the left eye and the right eye are generated by drawing images as viewed from the cameras 260a and 260b.

In a lower portion of FIG. 5, a display image 268a for the left eye and a display image 268b for the right eye are depicted schematically. It is to be noted that the see-through image is omitted and only the superimposition images 267 are depicted in both images. Since the cameras 260a and 260b have a parallax, the superimposition images 267 are displayed at positions displaced from each other in the horizontal direction on a plane of the left and right display images 268a and 268b. The displacement amount changes depending upon the distance Ds of the superimposition image 266 in the three-dimensional space. Consequently, the user perceives a sense of distance from the superimposition image 267.

Although, in FIG. 5, the see-through image 264 is indicated as a plane positioned at the same distance, in a case where stereoscopic vision is implemented, pictures of physical objects are displayed in the images for the left eye and the right eye with various displacement amounts, depending upon the actual positions of the physical objects. Consequently, in recognition of the user, the positions of the pictures have a distribution in the depthwise direction. The distribution can change by a great amount, depending upon a place where the user is located and a direction in which the user is oriented. For example, if the user who is looking at a remote wall on which nothing is placed changes the line of sight to a near table, then the distribution of distances of the pictures naturally varies by a great amount.

If the distance Ds of the superimposition image 266 is fixed against such an irregular change described, then there is a possibility that some contradiction may arise in the representation of a three-dimensional space. For example, such an unnatural image is displayed that, although a real physical object that partly overlaps with the superimposition image 266 is located in front of the superimposition image 266 in terms of a sense of distance, it is hidden by the superimposition image 266. Such an image possibly makes a cause of hardness in focusing of the eyes or visually induced motion sickness.

It can also be supposed to normally place the superimposition image 266 in a close range of the cameras 260a and 260b such that no spatial contradiction occurs. However, in this case, with such a field of view in which a physical object is present only at a remote place, it is also hard to focus the eyes because the distance from the superimposition image 266 in the depthwise direction is excessively great, and this possibly causes hardness in seeing or eye strain. Such defects possibly occur similarly also in a positional relation not only of a real physical object in a see-through image but also that of a real physical object that can be seen on a light transmission type wearable display, an object in a virtual space, or the like with a superimposition image.

Therefore, in the present embodiment, a virtual distance to be given to a superimposition image is determined depending upon a state of a three-dimensional space in the field of view. For example, the head-mounted display 100 acquires a distribution of distances to physical objects being present in a three-dimensional space in the field of view and determines the virtual distance of the superimposition image in reference to the distribution. This makes it possible to seamlessly transition from a main image world to a display state of a superimposition image, allowing the user to visually recognize various kinds of information without any stress.

Figure 6:
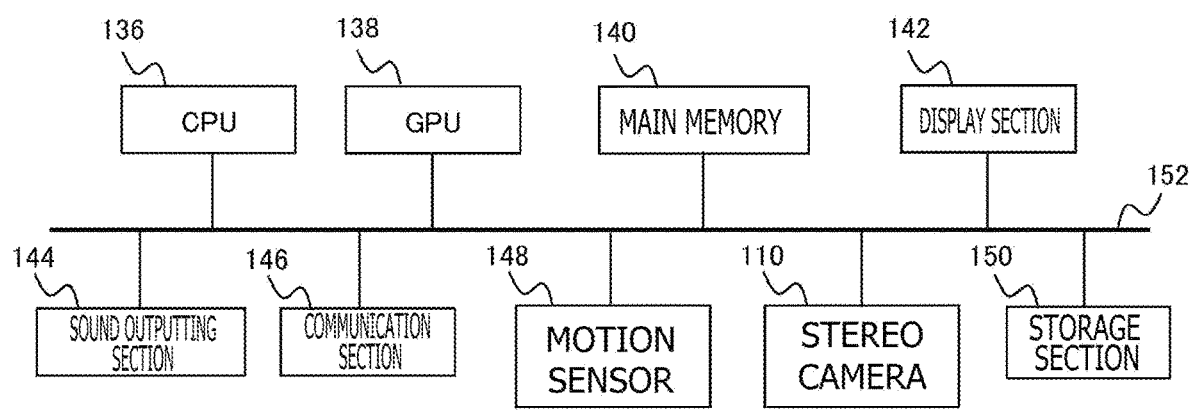
FIG. 6 is a block diagram depicting a configuration of an internal circuit of the head-mounted display in the present embodiment.

FIG. 6 depicts a configuration of an internal circuit of the head-mounted display 100. The head-mounted display 100 includes a CPU 136, a graphics processing unit (GPU) 138, a main memory 140, and a display section 142. These components are connected to each other by a bus 152. A sound outputting section 144, a communication section 146, a motion sensor 148, the stereo camera 110 and a storage section 150 are further connected to the bus 152. It is to be noted that the configuration of the bus 152 is not limited to any particular kind, and the bus 152 may have such a configuration that, for example, a plurality of buses are connected to each other by an interface.

The CPU 136 controls the overall head-mounted display 100 by executing an operating system stored in the storage section 150. Further, the CPU 136 executes various types of programs read out from the storage section 150 and loaded into the main memory 140 or downloaded through the communication section 146. The GPU 138 performs drawing and correction of an image according to a drawing command from the CPU 136. The main memory 140 includes a random access memory (RAM) and stores programs and data necessary for processing.

The display section 142 incudes the display panel 122 depicted in FIG. 3 and displays an image in front of the eyes of the user wearing the head-mounted display 100. The sound outputting section 144 includes speakers or earphones provided at positions corresponding to the ears of the user when the head-mounted display 100 is worn and outputs sound to be heard by the user.

The communication section 146 is an interface for transferring data to and from the content processing apparatus 200 and implements communication by a known wireless communication technology such as Bluetooth (registered trademark) or a wired communication technology. The motion sensor 148 includes a gyro sensor, an acceleration sensor, an angular speed sensor and so forth and acquires an inclination, an acceleration, an angular speed, and so forth of the head-mounted display 100. The stereo cameras 110 are a pair of video cameras that capture an image of a surrounding actual space from left and right points of view as depicted in FIG. 1. The storage section 150 includes a storage such as a read only memory (ROM).

Figure 7:
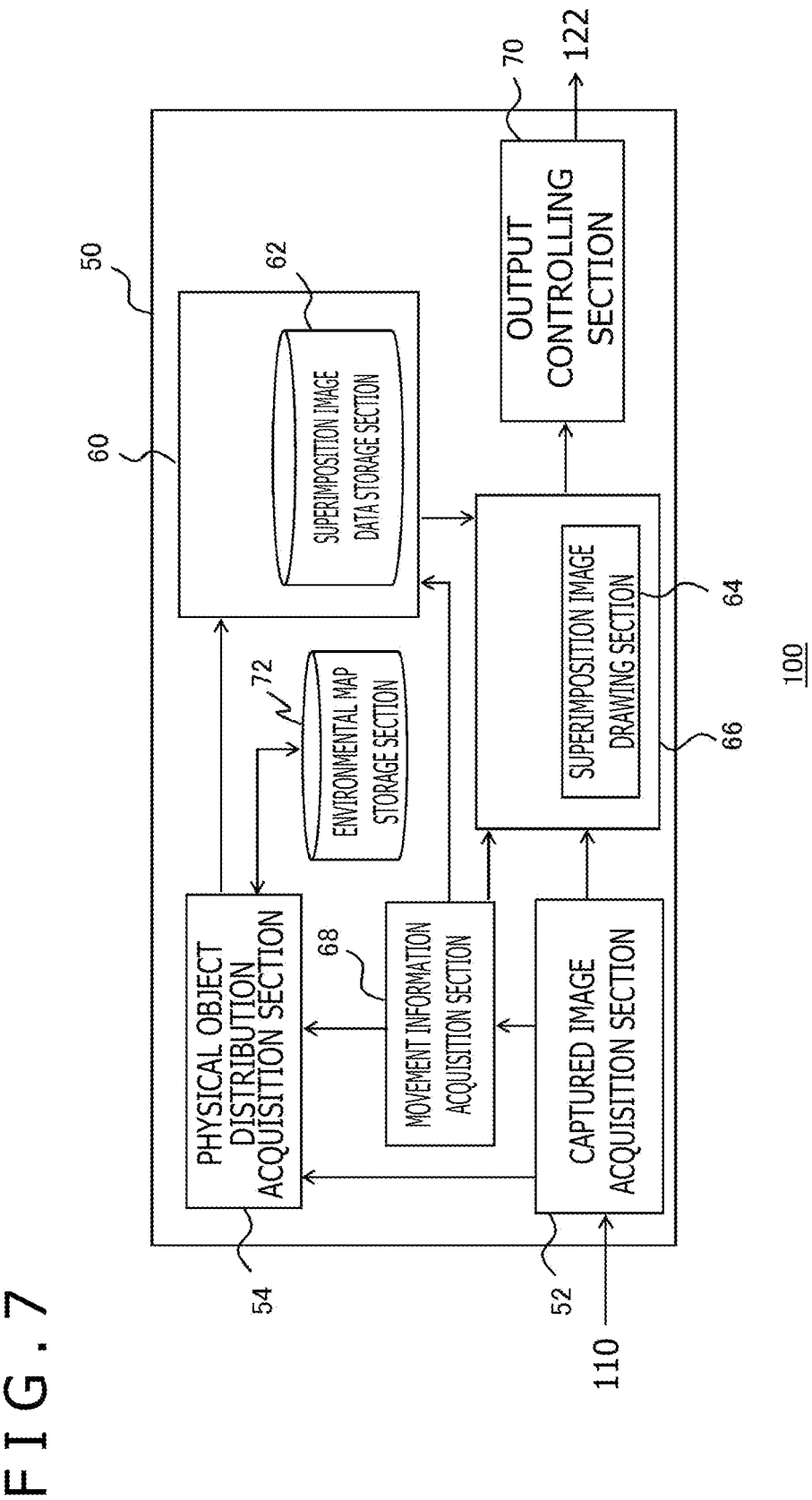
FIG. 7 is a block diagram depicting a configuration of functional blocks of the head-mounted display in the present embodiment.

FIG. 7 depicts a configuration of functional blocks of the head-mounted display 100 in the present embodiment. The functional blocks depicted can be implemented as hardware by the circuit configuration depicted in FIG. 6 and as software by a program that is loaded from the storage section 150 into the main memory 140 and performs various functions such as a data inputting function, a data retaining function, an image processing function, and a communication function. Accordingly, it can be recognized by those skilled in the art that these functional blocks can be implemented by hardware only, by software only, or by a combination of hardware and software and are not limited to any of them.

Further, the head-mounted display 100 may have functions other than those depicted in FIG. 7. Furthermore, some of the functional blocks depicted may be provided otherwise in the content processing apparatus 200. In the head-mounted display 100, an image processing section 50 can be implemented by the image processing integrated circuit 120 of FIG. 3.

In the head-mounted display 100, the image processing section 50 includes a captured image acquisition section 52 that acquires data of a captured image, a physical object distribution acquisition section 54 that acquires a distribution of distances of physical objects being present within the field of view, a superimposition image controlling section 60 that controls a state of a superimposition image, a display image generation section 66 that generates data of a display image, and an output controlling section 70 that outputs the data of the display image. The head-mounted display 100 further includes a movement information acquisition section 68 that acquires information relating to a movement of the head-mounted display 100, and an environmental map storage section 72 that stores an environmental map representative of placement of physical objects in a surrounding three-dimensional space.

The captured image acquisition section 52 acquires data of each captured image at a predetermined frame rate from image sensors of the stereo cameras 110. The physical object distribution acquisition section 54 analyzes each frame of the captured image to acquire a distribution of distances to physical objects being present in a three-dimensional space in the field of view. For example, the physical object distribution acquisition section 54 extracts corresponding points from the stereo images configuring the captured images by a known technology. The corresponding points are feature points in pair representative of a point on the same picture from among the feature points that can be extracted from the stereo images.

The physical object distribution acquisition section 54 derives, on the basis of the extracted corresponding point, distances to the point by the principle of triangulation. Generally, from each stereo image for one frame, a large number of corresponding points are extracted. In a case where control of the virtual distance of the superimposition image is intended, the physical object distribution acquisition section 54 may extract corresponding points from within a region in the captured image in which the superimposition image is to be combined or only within a region in a predetermined range from the relevant region, to calculate a distribution of distances.

A picture at a position spaced far from a superimposition image on an image plane has a less influence on hardness to see regardless of the distance of the image in the depthwise direction. Accordingly, if the distance distribution of physical objects is obtained only from a region close to the superimposition image and the virtual distance is adjusted according to the distance distribution, a significant effect can be obtained with high efficiency. Various techniques are available for analyzing a captured image to derive a distance to a subject or a feature point, and the physical object distribution acquisition section 54 may adopt any of such techniques.

The physical object distribution acquisition section 54 acquires a histogram of distance values obtained for each corresponding point as a distribution of distances of physical objects. Qualitatively, if the virtual distance of a superimposition image is set to a position closer to the user who is wearing the head-mounted display 100 (e.g., the cameras 260a and 260b in FIG. 5) than a range included in the distribution of distances in a three-dimensional space, no contradiction occurs between the pictures of the physical objects and the superimposition image. The physical object distribution acquisition section 54 derives an index representative of the distance on the side closer to the user who is wearing the head-mounted display 100 within the range included in the distribution of distances and notifies the superimposition image controlling section 60 of the index at a predetermined rate.

The index is hereinafter referred to as a "shortest distance index." The physical object distribution acquisition section 54 determines a 25-percent point of a distance value in the range of the distances included in the histogram as the shortest distance index. By determining the index of the shortest distance excluding 25 percent of the histogram, the influence of an error included in distance values derived from corresponding points can be reduced. However, the numerical value of the percent point is not limited.

In a case where the head-mounted display 100 has a function of Visual SLAM described hereinabove, the physical object distribution acquisition section 54 may be part of the function of Visual SLAM. Visual SLAM is a technology for acquiring three-dimensional position coordinates of feature points on a physical object from corresponding points obtained from stereo images and tracking the feature points on frames of the chronological order to acquire the positions and the postures of the stereo cameras 110 and an environmental map in parallel. The environmental map is data representative of a distribution of feature points of physical objects in a three-dimensional space. In this case, the physical object distribution acquisition section 54 may acquire a distance distribution on the basis of the three-dimensional position coordinates of the physical objects obtained by Visual SLAM to derive the shortest distance index.

The environmental map storage section 72 stores an environmental map generated by Visual SLAM or the like. The movement information acquisition section 68 includes the motion sensor 148 and acquires information relating to the position and the posture of the head-mounted display 100 (and the stereo cameras 110) at a predetermined rate. The information regarding the position and posture of each of the stereo cameras 110 by the movement information acquisition section 68 can be utilized for creation of an environmental map.

Further, if an environmental map is created once, then the distribution of distances of physical objects in the field of view can be acquired from the environmental map according to the position and the posture of the head-mounted display 100 at each time step. Accordingly, the physical object distribution acquisition section 54 may acquire position posture information regarding the head-mounted display 100 at a predetermined rate, for example, from the movement information acquisition section 68 and acquire the distribution of distances of physical objects being present in the corresponding field of view from the environmental map stored in the environmental map storage section 72.

In a case where a distance distribution of physical objects is to be calculated from captured images, the physical object distribution acquisition section 54 may acquire a distance distribution of only stationary physical objects that are installed in a three-dimensional space, such as furniture and facilities. For example, if the distance of a moving object that is likely to appear at a remarkably close range like a hand of the user is taken into consideration, the distance permitted for a superimposition image is restricted or fluctuated. Further, since a case in which such a moving object is present in the field of view is temporary in many cases, the necessity for consideration is low. Accordingly, the physical object distribution acquisition section 54 may be set variation of the distribution of distances within a period in which the head-mounted display 100 does not move at all so as not to be reflected on the shortest distance index, on the basis of a result of measurement by the movement information acquisition section 68.

It is to be noted that, in a case where the main display target is a virtual space, the physical object distribution acquisition section 54 acquires data of an environmental map in response to settings on a program such as a game that prescribes a configuration of the virtual space and stores the data into the environmental map storage section 72 in advance. Consequently, it is possible to acquire a distribution of distances of virtual physical objects being present in the field of view, according to information regarding the position and the posture of the head-mounted display 100, similarly as described hereinabove. Further, in the case of a light transmission type display, if stereo cameras are incorporated therein, a distance distribution can be acquired by a process similar to that of the head-mounted display 100 described so far.

The superimposition image controlling section 60 determines a virtual distance of a superimposition image in reference to the distribution of distances of physical objects and the shortest distance index during a period during which display of the superimposition image is required. As described hereinabove, the superimposition image controlling section 60 basically sets the distance of a superimposition image at a position closer to the user than the range included in the distribution of distances of physical objects. The superimposition image controlling section 60 further determines a size of a superimposition image in a three-dimensional space according to the virtual distance. In particular, the superimposition image controlling section 60 increases the size of the superimposition image as the virtual distance increases.

Consequently, an apparent size of a superimposition image (size on a display image) is made equal, irrespective of the virtual distance, in such a manner that visibility of characters and so forth does not change. The superimposition image controlling section 60 includes a superimposition image data storage section 62 that stores model data necessary for drawing of a superimposition image. The superimposition image data storage section 62 stores, for example, data such as character data representative of a superimposition image, placement of characters and figures, a shape of a background, the size on the display image, and color, in association with identification information regarding the superimposition image.

Even if the user faces in a substantially same direction, the shortest distance index can fluctuate minutely by a significantly small movement of the field of view. If the virtual distance is changed in response to this movement, it is considerable that the superimposition image fluctuates more than necessary and consequently becomes hard to see. Therefore, the superimposition image controlling section 60 continues to collect the shortest distance indices and aggregates to which distance class each of the shortest distance indices belongs. Then, the superimposition image controlling section 60 acquires a distance value set in advance as an optimum virtual distance for the distance class in which the shortest distance indices concentrate at a predetermined ratio or more. By grasping the distribution of distances over a period longer than the frame period in this manner and deriving an optimum virtual distance by a probability theory, the accuracy of the placement of the superimposition image can be enhanced, and the necessity for resetting with high frequency is eliminated.

When the field of view changes by a great amount and as a result, the distance distribution information changes by a great amount, the superimposition image controlling section 60 may request the display image generation section 66 to change the virtual distance of the superimposition image. The superimposition image controlling section 60 may continue to normally derive an optimum virtual distance according to a change of the shortest distance index or may intermittently derive an optimum virtual distance as necessary.

Further, the superimposition image controlling section 60 may predict, according to the movement of the head-mounted display 100, a field of view after stopping, on the basis of a result of measurement by the movement information acquisition section 68, to determine a virtual distance before stopping. If the superimposition image in the display image is changed according to this determination, at a time of stopping the head-mounted display 100, it is possible to appropriately make the superimposition image appear at a new distance. In this case, the physical object distribution acquisition section 54 acquires the distribution of distances of physical objects being present in the predicted field of view using the environmental map to derive the shortest distance index.

The superimposition image controlling section 60 supplies model data of a superimposition image to be displayed and information regarding an optimum virtual distance to the display image generation section 66. Thereafter, when a change by a threshold value or more occurs with the virtual distance derived from the shortest distance index, or as needed, the superimposition image controlling section 60 provides information regarding the optimum virtual distance at the point of time to the display image generation section 66.

In the see-through mode, the display image generation section 66 generates data of a display image including a see-through image. However, the main image to be generated by the display image generation section 66 is not limited to the see-through image as described hereinabove. Further, during a period during which display of the superimposition image is required, the display image generation section 66 generates a display image including the superimposition image placed at the determined virtual distance. In particular, the display image generation section 66 represents the superimposition image on each of the display images for the left eye and the right eye with a displacement amount (parallax) corresponding to the virtual distance.

The display image generation section 66 includes a superimposition image drawing section 64 that functions during a period during which display of the superimposition image is required. The superimposition image drawing section 64 draws the superimposition image on an original display image such that it has a parallax corresponding to the virtual distance. In a case where a change of the virtual distance is to be reflected on the display, the superimposition image drawing section 64 changes the parallax while maintaining the size of the superimposition image on the display image plane.

The superimposition image drawing section 64 further controls a timing of starting or stopping of drawing of the superimposition image. For example, the superimposition image drawing section 64 starts drawing of the superimposition image after a predetermined period of time after the necessity for displaying the superimposition image arises and represents the superimposition image as the display image. The predetermined period of time is, for example, approximately one second, and accordingly, the setting accuracy of the distance of the superimposition image attributable to the distance distribution of physical objects that can be collected during the predetermined period of time and a low latency of display are balanced.

Further, in a case where it is detected on the basis of information from the superimposition image controlling section 60 that the appropriate virtual distance has changed during display of the superimposition image, the superimposition image drawing section 64 temporarily puts the superimposition image into a non-displayed state and then redraws the superimposition image at the virtual distance after the change. At this time, the superimposition image drawing section 64 may cause the superimposition image before the change to fade out and cause the superimposition image after the change to fade in such that the change of the distance becomes less conspicuous.

As an alternative, the superimposition image drawing section 64 may change the virtual distance on a displayed superimposition image only during a period during which the head-mounted display 100 is regarded as moving on the basis of a result of measurement by the movement information acquisition section 68. Since, during a period during which the head moves and the field of view changes by a great amount, the degree of attention to a display image is low, changing the virtual distance during the period allows the user to be less likely to perceive the change. As another alternative, the superimposition image drawing section 64 may gradually change the virtual distance of the superimposition image in the display image such that the virtual distance reaches a target virtual distance. In this case, the superimposition image looks like moving in the depthwise direction while changing its size, to the user.

The output controlling section 70 acquires data of the display image from the display image generation section 66, performs a predetermined process on the data and outputs resulting data to the display panel 122. The display image includes a pair of images for the left eye and the right eye and, depending on the case, a superimposition image is combined with each of the images. The output controlling section 70 may correct the display image in a direction in which the distortion aberration or chromatic aberration is cancelled such that, when viewed through the eyepieces, an image free from distortion can be visually recognized. The output controlling section 70 may additionally perform various types of data conversions corresponding to the display panel 122.

Figure 8:
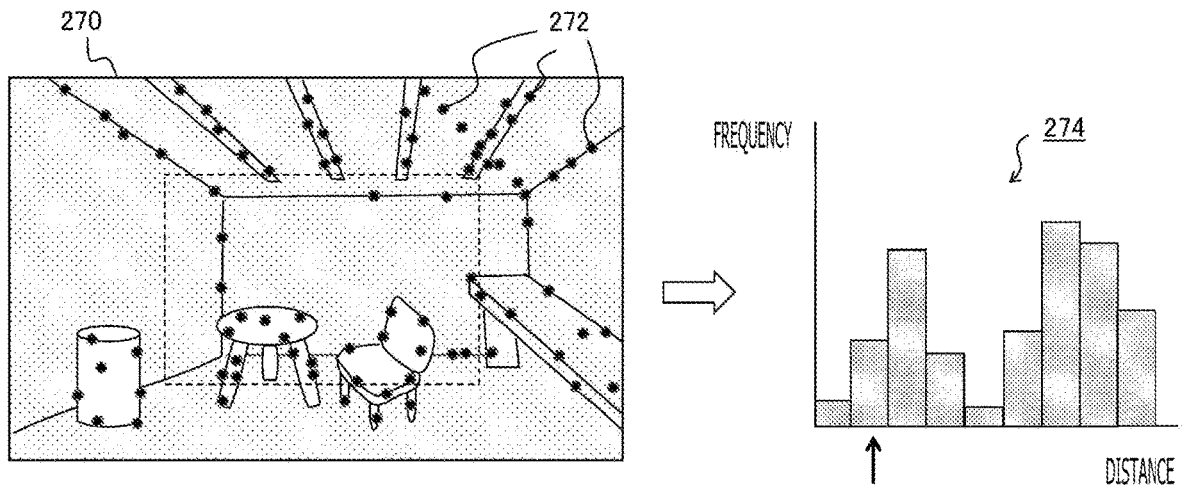
FIG. 8 is a view illustrating distance distribution information acquired from a captured image by a physical object distribution acquisition section in the present embodiment.

FIG. 8 is a view illustrating distance distribution information to be acquired from the captured image by the physical object distribution acquisition section 54. The physical object distribution acquisition section 54 first extracts corresponding points (for example, corresponding points 272) from a frame 270 of the captured image. Although one frame is depicted in FIG. 8, in actual implementation, corresponding feature points are extracted from stereo images captured by the stereo cameras 110.

Then, the physical object distribution acquisition section 54 calculates the distance to points on physical objects represented by the corresponding points on the basis of the parallax of the corresponding points and generates a histogram 274 representing the frequencies of the corresponding points with respect to the distance. Then, the physical object distribution acquisition section 54 calculates the distance value of, for example, such a predetermined percent point (for example, a 25-percent point) as indicated by an arrow mark and determines the distance value as the shortest distance index. The physical object distribution acquisition section 54 aggregates the distances of the corresponding points in frames during the period, for example, at such a rate of 15 Hz or 30 Hz, to derive the shortest distance index.

Figure 9:
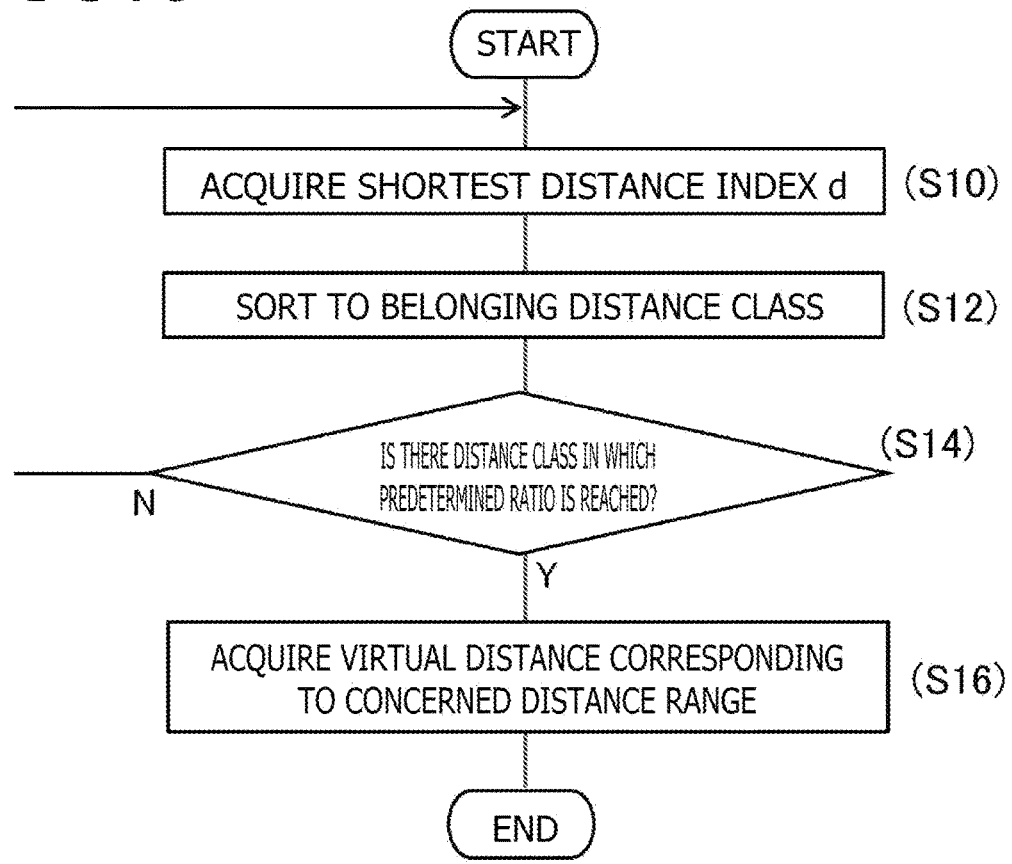
FIG. 9 is a flow chart depicting a procedure for deriving a virtual distance of a superimposition image by a superimposition image controlling section in the present embodiment.

FIG. 9 is a flow chart depicting a procedure by the superimposition image controlling section 60 for deriving a virtual distance of a superimposition image. First, the superimposition image controlling section 60 acquires a shortest distance index d from the physical object distribution acquisition section 54 (S10), and sorts the shortest distance index d to a concerned distance class from among distance classes set in advance (S12). The distance class is a range of the distance where the distance from the rendering camera is classified roughly and also is a unit for determining a virtual distance of the superimposition image.

In a case where the number of distance classes is two, for example, the range of $0 < d \leq 1.2$ mm is prepared as the class for a short range, and the range of $1.5 \text{ m} < d$ is prepared as a long range. If the shortest distance index d is in the middle and does not belong to any of the distance classes, the superimposition image controlling section 60 may not sort the relevant shortest distance index d. It is to be noted that, in the present embodiment, the number of distance classes and a boundary value are not limited to any number. Further, a virtual distance may be determined directly from the shortest distance index d without providing such distance classes. However, in this case, it becomes more significant to take such a countermeasure as to limit an opportunity of a change in display such that a minute fluctuation of the virtual distance may not be reflected on the display.

Then, the superimposition image controlling section 60 checks whether or not there is a distance class in which the number of shortest distance indices sorted thereto reaches a predetermined ratio, and repeats the processes in S10 and S12 when there is no such distance class (N in S14). The sorted number of shortest distance indices is increased in this manner, and if the sorted number in a particular distance class reaches the predetermined ratio (Y in S14), the superimposition image controlling section 60 acquires a virtual distance associated in advance with the concerned distance class as an optimum virtual distance (S16). Here, the predetermined ratio is a ratio with which it can be regarded that the probability that the shortest distance index d belongs to the distance class is sufficiently higher than those in the other distance classes and is, for example, 80% or the like.

In the example described above, for example, 0.5 m is associated with the class $0 < d \leq 1.2$ m in the short range as a virtual distance in advance. For example, 1.5 m is associated with the class $1.5 \text{ m} < d$ in the long range as a virtual distance in advance. More specifically, in the present case, one of 0.5 m and 1.5 m is selected as a virtual distance according to a result of the decision of Y in S14. As the virtual distance to be associated with each distance class comes near to a boundary of the distance class on the side closer to the user, it becomes more liable to prevent spatial contradiction between the superimposition image and the physical object.

Even if the shortest distance index d fluctuates, if there is a significant difference in probability at which the shortest distance index d belongs to each of the distance classes, a distance class of a higher probability can be adopted to determine a virtual distance by the processing procedure depicted in FIG. 9, and a possibility that the display of the superimposition image may become inappropriate can be reduced. If the shortest distance index d does not have a great fluctuation, the sorted number naturally concentrates on a certain distance class, so that a virtual distance of the superimposition image can be determined in a short period of time.

Figure 10:
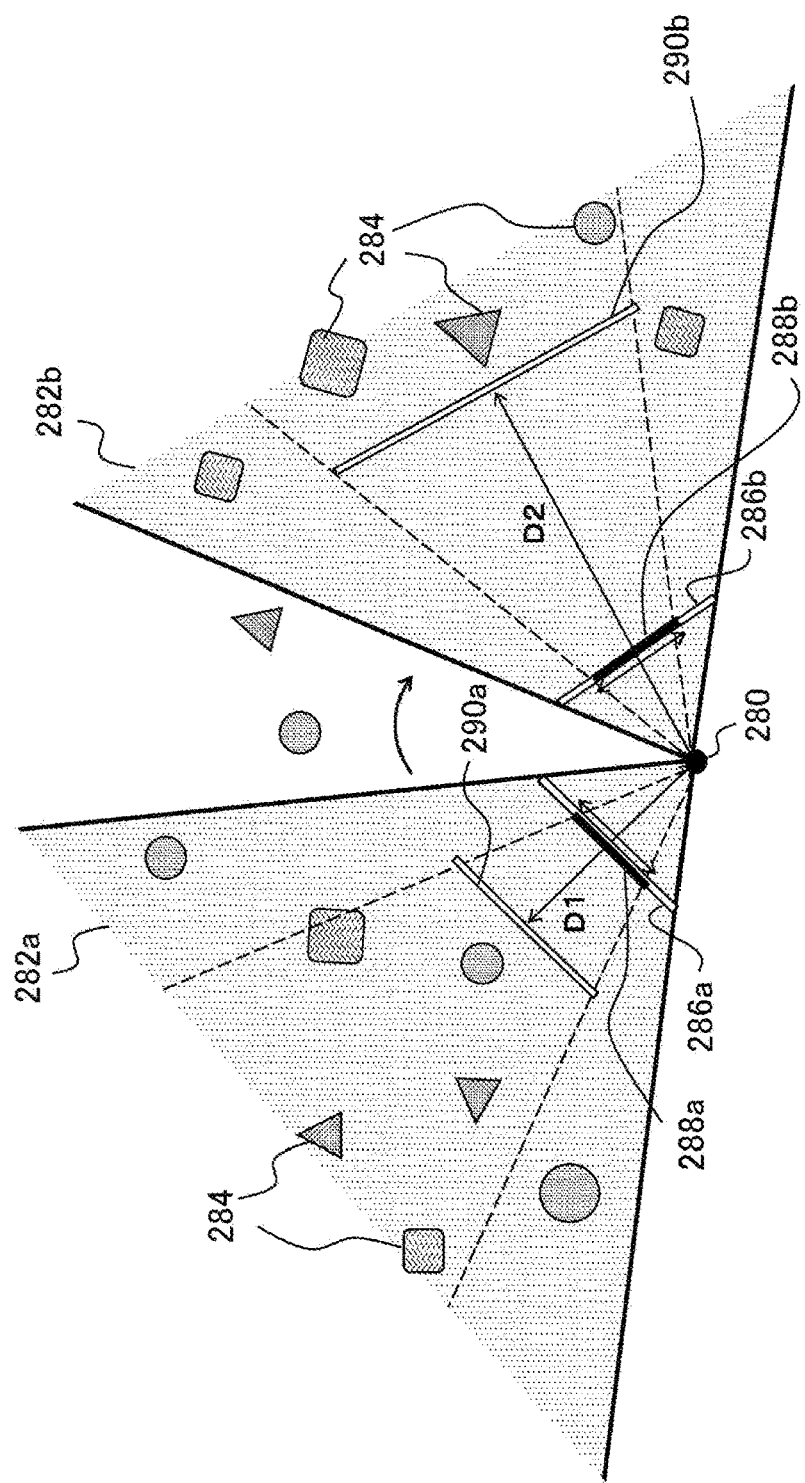
FIG. 10 is a diagrammatic view illustrating a change of a superimposition image by turning of the field of view in the present embodiment.

FIG. 10 is a view illustrating a change of the superimposition image by turning of the field of view. FIG. 10 schematically depicts, in a bird's-eye view, positional relations between fields of view 282a and 282b of a see-through image expanding from the point of view 280 of the user and physical objects therearound (for example, a physical object 284). When the field of view of the see-through image is the field of view 282a, physical objects in the field of view are distributed relatively close to the user. In the see-through mode, pictures of the physical objects are projected to and displayed on a viewscreen 286a.

In a case where a superimposition image 288a is to be represented as indicated in black on the viewscreen 286a, the superimposition image controlling section 60 determines a virtual distance D1 of an object 290a of the superimposition image in a three-dimensional space. At this time, the superimposition image controlling section determines the virtual distance D1 such that the object 290a of the superimposition image is positioned closer to the user than a range in which physical objects are distributed. For the determination of the virtual distance D1, it is sufficient if the distribution of physical objects in an angle of view indicated by broken lines and corresponding to a display region of the superimposition image 288a or within an angle of view within a predetermined range from the angle of view mentioned above is taken into consideration.

Here, it is assumed that the user turns the head in a rightward direction and the field of view of the see-through image changes to the field of view 282b. In the field of view 282b, physical objects are distributed relatively far from the user. In a case where a superimposition image 288b is to be represented on a viewscreen 286b in this state, the superimposition image controlling section 60 newly determines a virtual distance D2 of an object 290b of the superimposition image.

Since, in comparison with the field of view 282a, in the field of view 282b, physical objects are distributed far within the angle of view corresponding to a display region of the superimposition image 288b, the appropriate virtual distance D2 becomes greater than the virtual distance D1. In response to such a change as just described, the superimposition image controlling section 60 increases the size of the object 290b of the superimposition image in both of the vertical and horizontal directions at a ratio same as that of the change of the virtual distance. Consequently, the size of the superimposition image 288b on the viewscreen 286b is kept same as that of the superimposition image 288a on the viewscreen 286a, and the visibility of characters and so forth is maintained, irrespective of the virtual distance.

Although FIG. 10 representatively depicts the field of view 282a and the field of view 282b, in actual implementation, such states possibly occur as a state in a transitional period in which the field of view changes greatly from the field of view 282a to the field of view 282b or a state in which the field of view has a small change although it is substantially same as the field of view 282a or the field of view 282b. In the former case, it is necessary to switch the virtual distance from the virtual distance D1 to the virtual distance D2 in a certain stage. If this switching is immediately reflected on the display, the superimposition image having been viewed so far by the user moves suddenly, and it can be considered that the user may feel hard to see or may have discomfort.

Therefore, the superimposition image drawing section 64 of the display image generation section 66 causes the superimposition image 288a having been displayed at the virtual distance D1 to fade out simultaneously as turning of the field of view is started and puts the superimposition image 288a in a non-display state, and when the virtual distance D2 is determined, causes the superimposition image 288b to fade in at the virtual distance D2. Further, the superimposition image drawing section 64 may complete the movement to the virtual distance D2 within a period in which an amount of the movement of the head of the user is equal to or greater than a predetermined value in the transitional period from the field of view 282a to the field of view 282b. In some cases, the superimposition image drawing section 64 may gradually move the superimposition image from the virtual distance D1 to the virtual distance D2 in the transitional period from the field of view 282a to the field of view 282b.

Figure 11:
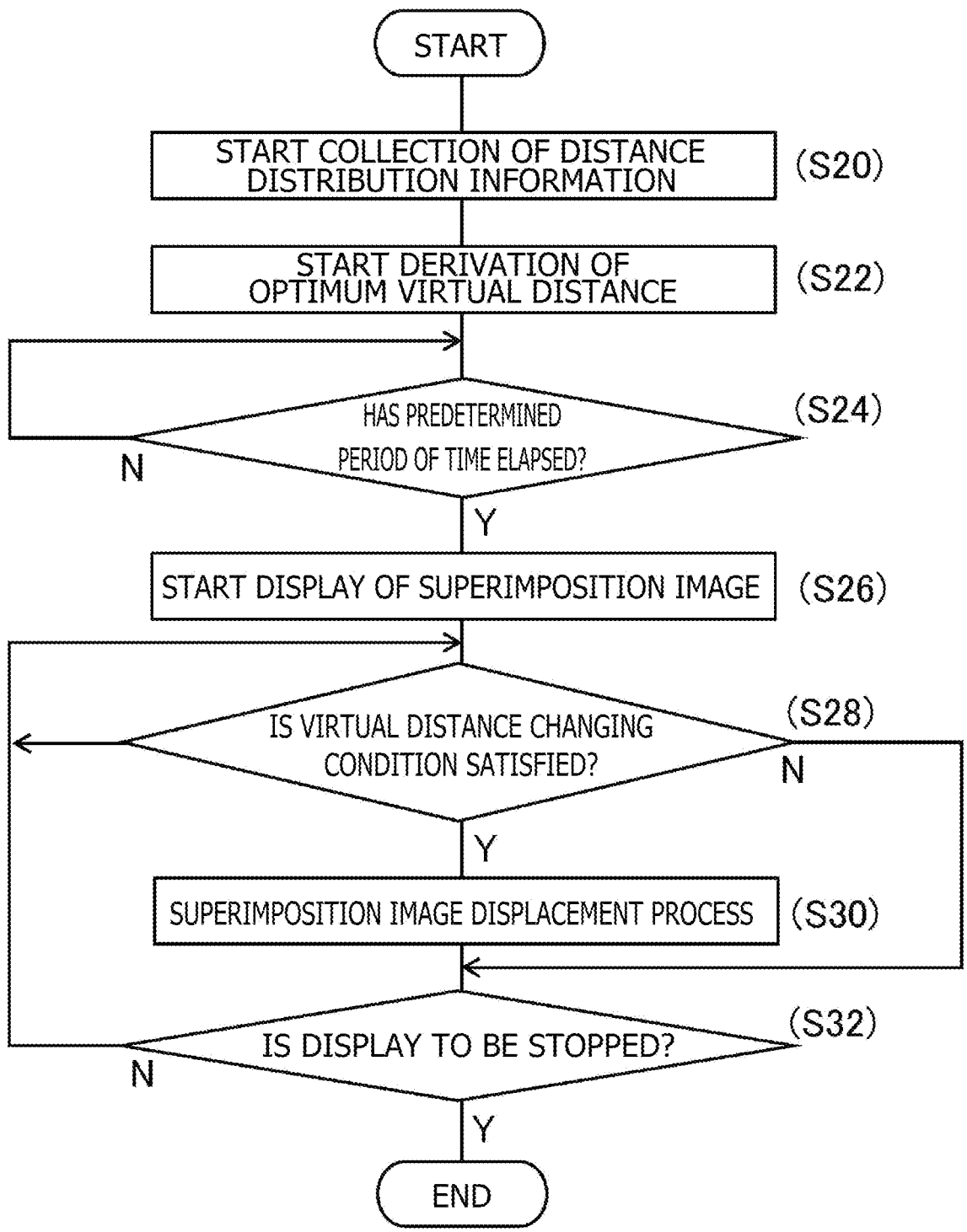
FIG. 11 is a flow chart depicting a processing procedure of the head-mounted display of displaying a superimposition image in the present embodiment.

Now, action of the head-mounted display that can be implemented by the configuration described above is described. FIG. 11 is a flow chart depicting a processing procedure of the head-mounted display 100 for displaying a superimposition image. This flow chart is started when the necessity to display a superimposition image arises in a state in which the user wears the head-mounted display 100 and looks at a see-through image.

First, the physical object distribution acquisition section 54 starts collection of distance distribution information regarding physical objects being present in the field of view on the basis of each frame of each captured image by the stereo cameras 110 (S20). Then, the superimposition image controlling section 60 starts derivation of an optimum virtual distance through the processing procedure depicted in FIG. 9 (S22). The processes in S20 and S22 are continuously performed during a period during which the superimposition image is displayed or during a predetermined period after it is found out that the field of view has been turned by a great amount.

The superimposition image drawing section 64 of the display image generation section 66 monitors a period of time elapsing after the necessity to display a superimposition image arises and waits until a predetermined period of time such as one second elapses (N in S24). If the predetermined time period of elapses (Y in S24), the superimposition image drawing section 64 combines the superimposition image with the display image with a parallax according to the optimum value of the virtual distance obtained so far and causes the display panel 122 to display the combined image through the output controlling section 70 (S26).

During a period during which a predetermined condition for changing the virtual distance is not satisfied (N in S28), unless it is necessary to stop the display of the superimposition image, the superimposition image drawing section 64 continues to draw the superimposition image at the same position with respect to a succeeding see-through image (N in S32). The predetermined condition for changing the virtual distance is, for example, that the shortest distance index acquired by the physical object distribution acquisition section 54 or the virtual distance derived by the superimposition image controlling section 60 changes by an amount equal to or greater than a threshold value. Alternatively, the predetermined condition may be that a movement amount or a movement speed of the head-mounted display 100 acquired by the movement information acquisition section 68 becomes a value equal to or higher than a threshold value, or a like case. Any of them or a combination of them may be determined as the condition.

After such a condition as described above is satisfied (Y in S28), the superimposition image drawing section 64 of the display image generation section 66 carries out a process for displacing the superimposition image on the display (S30). In particular, the superimposition image drawing section 64 may put the superimposition image having been displayed so far into a non-display state once and then redisplay the superimposition image at the virtual distance after the change or may gradually move the superimposition image to the virtual distance after the change from the virtual distance before the change. Further, the superimposition image drawing section 64 may carry out the displacement process within a period in which the head-mounted display 100 is moving at a speed equal to or higher than a predetermined speed.

Thereafter, until it becomes necessary to stop the display of the superimposition image, the superimposition image drawing section 64 continues to draw the superimposition image at the position after the change with respect to a succeeding see-through image (N in S32 and N in S28), and displaces the superimposition image as necessary (Y in S28 and S30). If it becomes necessary to stop the display of the superimposition image, the superimposition image drawing section 64 stops all processes relating to the superimposition image (Y in S32). Every time it becomes necessary to display a superimposition image, the head-mounted display 100 repeats similar processes.

According to the present embodiment described above, a head-mounted display that implements stereoscopic vision adjusts a virtual distance of a superimposition image according to a distribution of distances of physical objects in a three-dimensional space within a field of view. Consequently, it is possible to make a superimposition image of which masking is not preferable in terms of its characteristic appear natural in such a manner that the superimposition image is in front of the physical objects also in the three-dimensional space. Further, since the superimposition image is placed at a distance substantially same as those of the physical objects, the user is likely to focus on the superimposition image. As a result, the user can visually recognize the superimposition image without any stress, with a sense similar to that before the superimposition image is displayed.

Further, even if the distance in the three-dimensional space is changed, the visibility of the contents of the superimposition image can be maintained by the control for keeping the apparent size of the superimposition unchanged. Furthermore, distribution information regarding physical objects in the field of view is collected continuously, and a likely optimum virtual distance is derived by a statistical process. Consequently, the influence of fluctuation regarding the distribution information of the physical objects by the movement of the head can be suppressed, and such a situation that the superimposition image displaces repeatedly or an excessive period of time is required until the superimposition image is displayed is less likely to occur.

Further, in switching of the virtual distance, the superimposition image before switching is faded out once, and then the superimposition image after the switching is faded in. Furthermore, within a period in which the speed of the movement of the head is high, display of the superimposition image after the switching is started. These processes enable discomfort attributable to a sudden displacement of the superimposition image to be suppressed, allowing transition to an optimum state to be achieved smoothly.

The present disclosure has been described in connection with the embodiment. The embodiment is exemplary, and it can be recognized by those skilled in the art that various modifications can be made in the components and the processes of the embodiment and that also such modifications fall within the scope of the present disclosure.

What is claimed is:

1. A head-mounted display implementing stereoscopic vision, comprising:
   a central processing unit;
   a graphical processing unit; and
   a main memory;
   wherein the head-mounted display is configured to:
   determine a virtual distance of a superimposition image to be displayed, according to a state of a three-dimensional space in a field of view;
   generate data of a display image including the superimposition image in a state in which the superimposition image is placed at the virtual distance in the three-dimensional space; and
   output the data of the display image to a display panel,
   wherein the head-mounted display is further configured to:
   acquire a distribution of distances to physical objects being present in the three-dimensional space in the field of view;
   determine a virtual distance of the superimposition image in reference to the distribution of distances;
   acquire a captured image of a real space in a direction of a line of sight of a user;
   acquire a distribution of distances of real physical objects on a basis of the captured image; and
   generate the data of the display image in which the superimposition image is displayed on the captured image.

2. The head-mounted display according to claim 1, wherein the head-mounted display is configured to: acquire a distribution of distances of physical objects whose pictures appear in a region in which the superimposition image is to be displayed on a plane of the display image or in a region of a predetermined range from the relevant region.

3. The head-mounted display according to claim 1, wherein the head-mounted display is configured to:
   acquire a position and a posture of the head-mounted display at a predetermined rate;
   store an environmental map representing a distribution of feature points of the physical objects in the three-dimensional space; and
   acquire a distribution of distances to physical objects being present in a field of view corresponding to the position and the posture of the head-mounted display from the environmental map.

4. The head-mounted display according to claim 3, wherein the head-mounted display is configured to:
   acquire a histogram of distances to the feature points of the physical objects and acquires a value of a predetermined percentage point in the histogram; and
   determine a virtual distance of the superimposition image according to a distance class in which the percentage points are concentrated by a predetermined ratio or more.

5. The head-mounted display according to claim 1, wherein the head-mounted display is configured to:
   display, after a predetermined period of time from determination of start of display of the superimposition image, the superimposition image on the display image according to the virtual distance determined in the predetermined period of time.

6. The head-mounted display according to claim 1, wherein the head-mounted display is configured to:
   increase a size of the superimposition image in the three-dimensional space as the virtual distance increases.

7. The head-mounted display according to claim 1, wherein the head-mounted display is configured to:
   change the virtual distance of the superimposition image so as to correspond to a change of the state attributable to a change of the field of view.

8. The head-mounted display according to claim 7, wherein the head-mounted display is configured to:
   acquire a movement of the head-mounted display; and
   complete the change of the virtual distance within a period in which the head-mounted display has a movement at a speed equal to or higher than a predetermined speed.

9. The head-mounted display according to claim 7, wherein the head-mounted display is configured to:
cause, in the change of the virtual distance, the superimposition image before the change to fade out and the superimposition image after the change to fade in.

10. The head-mounted display according to claim 7, wherein the head-mounted display is configured to:
cause a position of the superimposition image in the three-dimensional space to gradually reach the changed virtual distance.

11. The head-mounted display according to claim 1, wherein the head-mounted display is configured to:
acquire a shortest distance index from the distribution of distances of physical objects; and
sort the shortest distance index to a concerned distance class from among a plurality of distance classes.

12. The head-mounted display according to claim 11, wherein the head-mounted display is configured to:
determine whether there is a distance class in which a number of shortest distance indices reaches a predetermined ratio.

13. An image displaying method performed by a head-mounted display implementing stereoscopic vision, the image displaying method comprising:
determining a virtual distance of a superimposition image to be displayed, according to a state of a three-dimensional space in a field of view;
generating data of a display image including the superimposition image in a state in which the superimposition image is placed at the virtual distance in the three-dimensional space; and
outputting the data of the display image to a display panel, wherein the method further comprises:
acquiring a distribution of distances to physical objects being present in the three-dimensional space in the field of view;
determining a virtual distance of the superimposition image in reference to the distribution of distances;
acquiring a captured image of a real space in a direction of a line of sight of a user;
acquiring a distribution of distances of real physical objects on a basis of the captured image; and
generating the data of the display image in which the superimposition image is displayed on the captured image.

14. The method of claim 13 further comprising:
acquiring a distribution of distances of physical objects whose pictures appear in a region in which the superimposition image is to be displayed on a plane of the display image or in a region of a predetermined range from the relevant region.

15. The method of claim 13 further comprising:
acquiring a position and a posture of the head-mounted display at a predetermined rate;
storing an environmental map representing a distribution of feature points of the physical objects in the three-dimensional space; and
acquiring a distribution of distances to physical objects being present in a field of view corresponding to the position and the posture of the head-mounted display from the environmental map.

16. The method of claim 13 further comprising:
acquiring a shortest distance index from the distribution of distances of physical objects;
sorting the shortest distance index to a concerned distance class from among a plurality of distance classes; and
determining whether there is a distance class in which a number of shortest distance indices reaches a predetermined ratio.

17. A non-transitory computer-readable information storage medium for storing a program for causing a computer in a head-mounted display implementing stereoscopic vision to:
determine a virtual distance of a superimposition image to be displayed, according to a state of a three-dimensional space in a field of view;
generate data of a display image including the superimposition image in a state in which the superimposition image is placed at the virtual distance in the three-dimensional space;
output the data of the display image to a display panel;
acquire a distribution of distances to physical objects being present in the three-dimensional space in the field of view;
determine a virtual distance of the superimposition image in reference to the distribution of distances;
acquire a captured image of a real space in a direction of a line of sight of a user;
acquire a distribution of distances of real physical objects on a basis of the captured image; and
generate the data of the display image in which the superimposition image is displayed on the captured image.

18. The non-transitory computer-readable information storage medium of claim 17 to further:
acquire a distribution of distances of physical objects whose pictures appear in a region in which the superimposition image is to be displayed on a plane of the display image or in a region of a predetermined range from the relevant region.

19. The non-transitory computer-readable information storage medium of claim 14 to further:
acquire a position and a posture of the head-mounted display at a predetermined rate;
store an environmental map representing a distribution of feature points of the physical objects in the three-dimensional space; and
acquire a distribution of distances to physical objects being present in a field of view corresponding to the position and the posture of the head-mounted display from the environmental map.

20. The non-transitory computer-readable information storage medium of claim 17 to further:
acquire a shortest distance index from the distribution of distances of physical objects;
sort the shortest distance index to a concerned distance class from among a plurality of distance classes; and
determine whether there is a distance class in which a number of shortest distance indices reaches a predetermined ratio.

* * * * *